June 27, 1961 V. L. R. JAMES 2,990,148
AIRBORNE STAIRS
Filed May 10, 1957 8 Sheets-Sheet 1
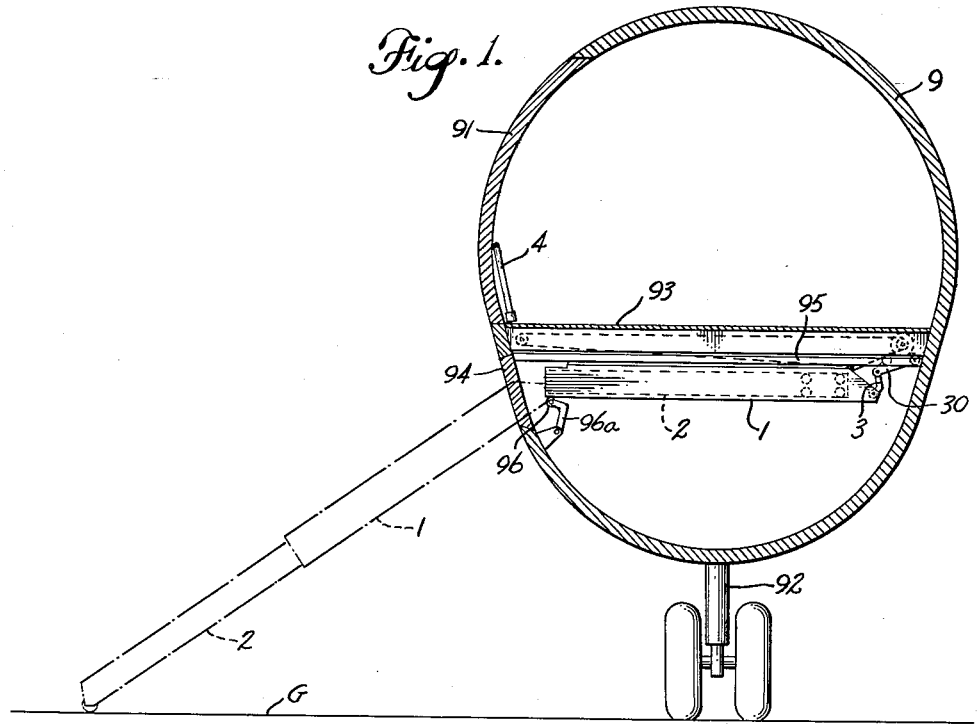
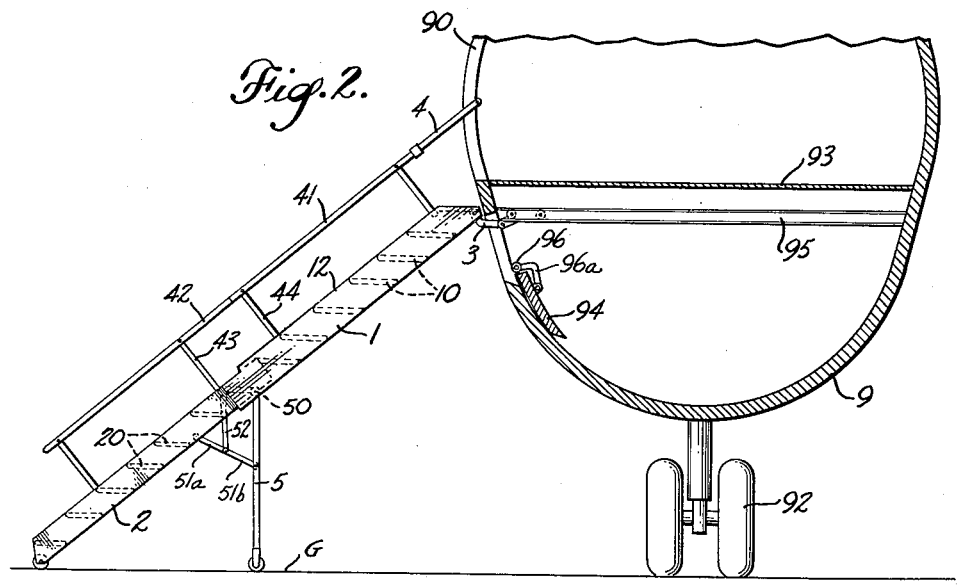
INVENTOR.
VARNELL L. R. JAMES
BY Reynolds, Beach & Christensen
ATTORNEYS June 27, 1961
V. L. R. JAMES
2,990,148
AIRBORNE STAIRS
Filed May 10, 1957
8 Sheets-Sheet 2
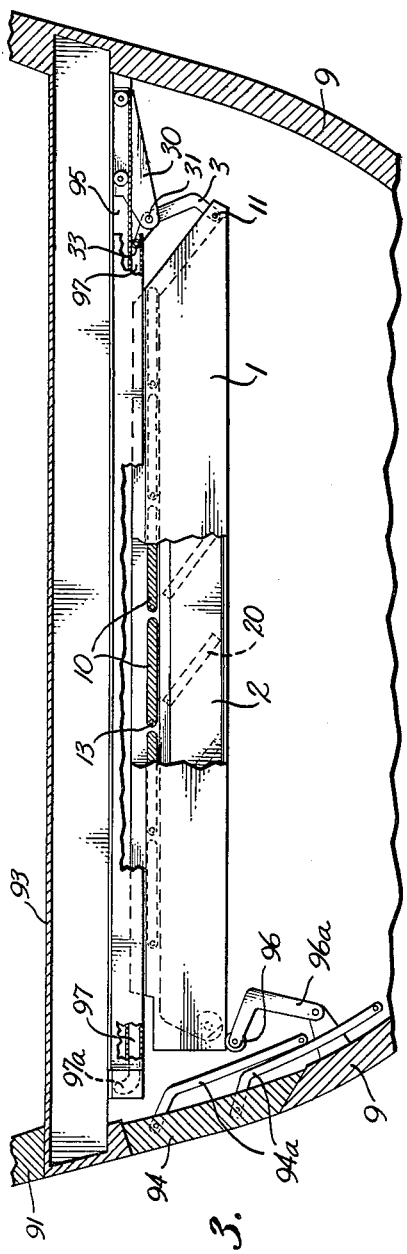
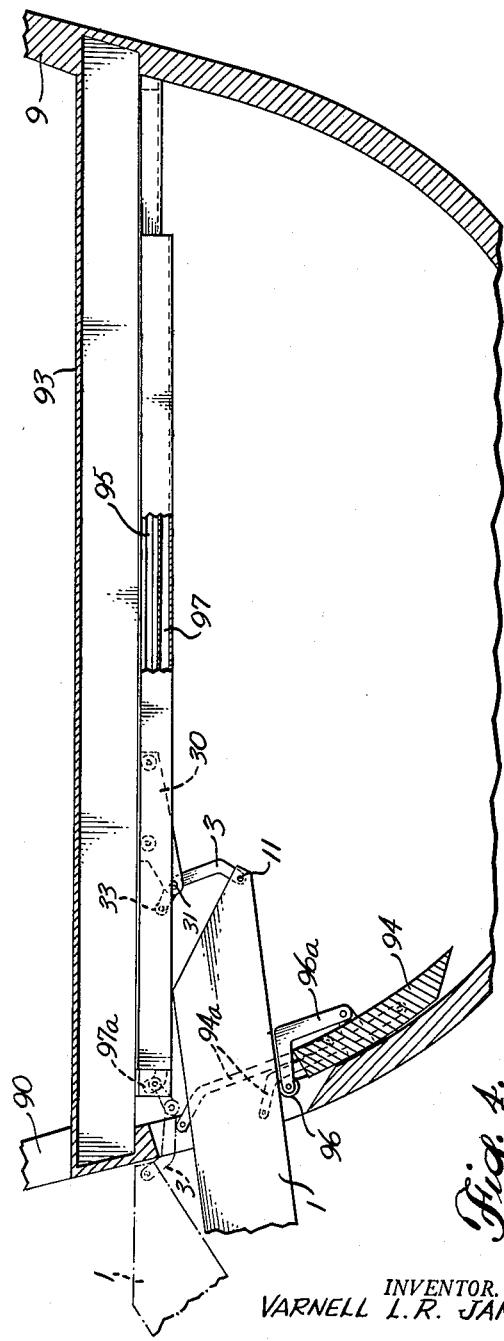
INVENTOR.
VARNELL L.R. JAMES
BY
Reynolds, Beach & Christensen
ATTORNEYS

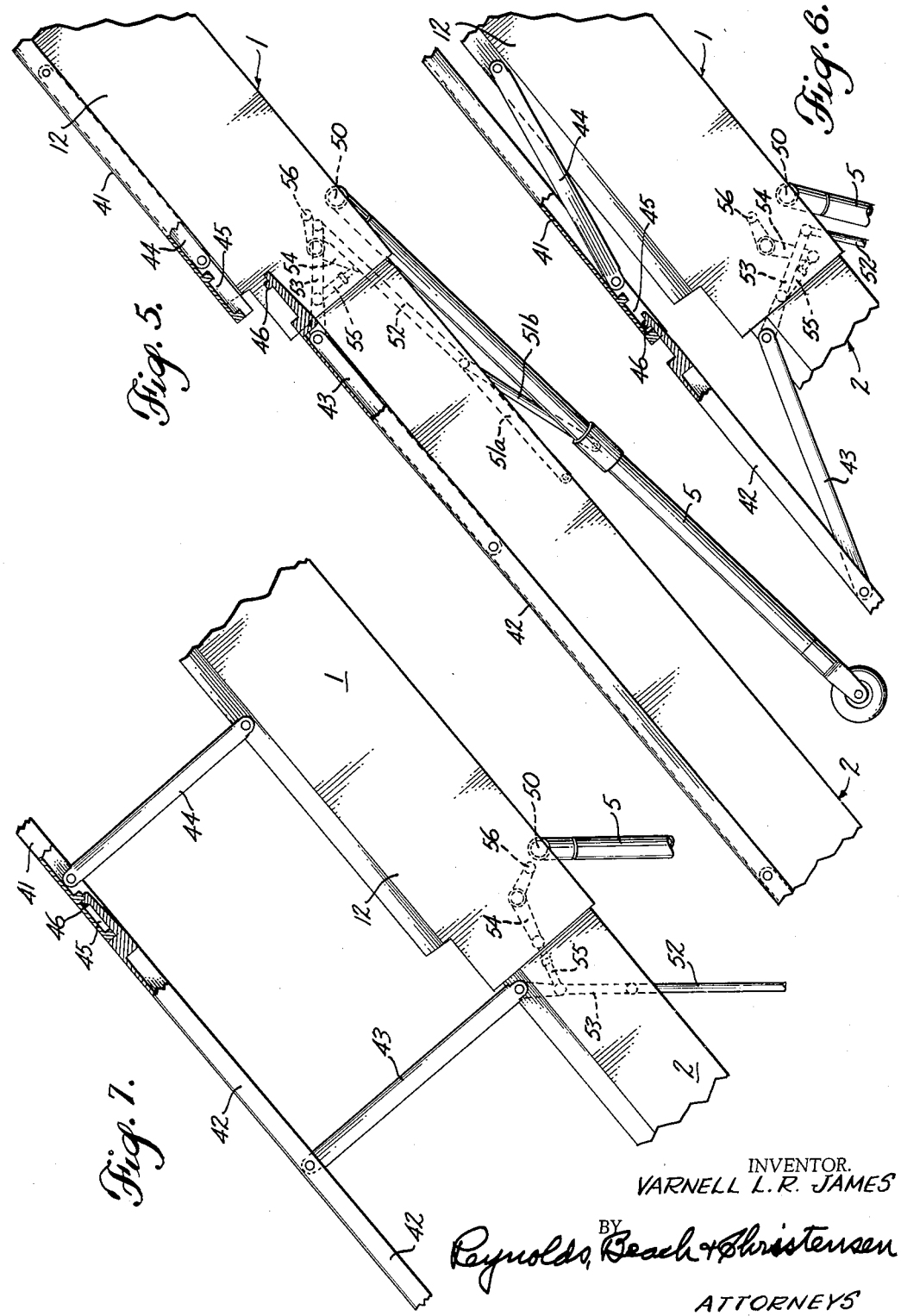

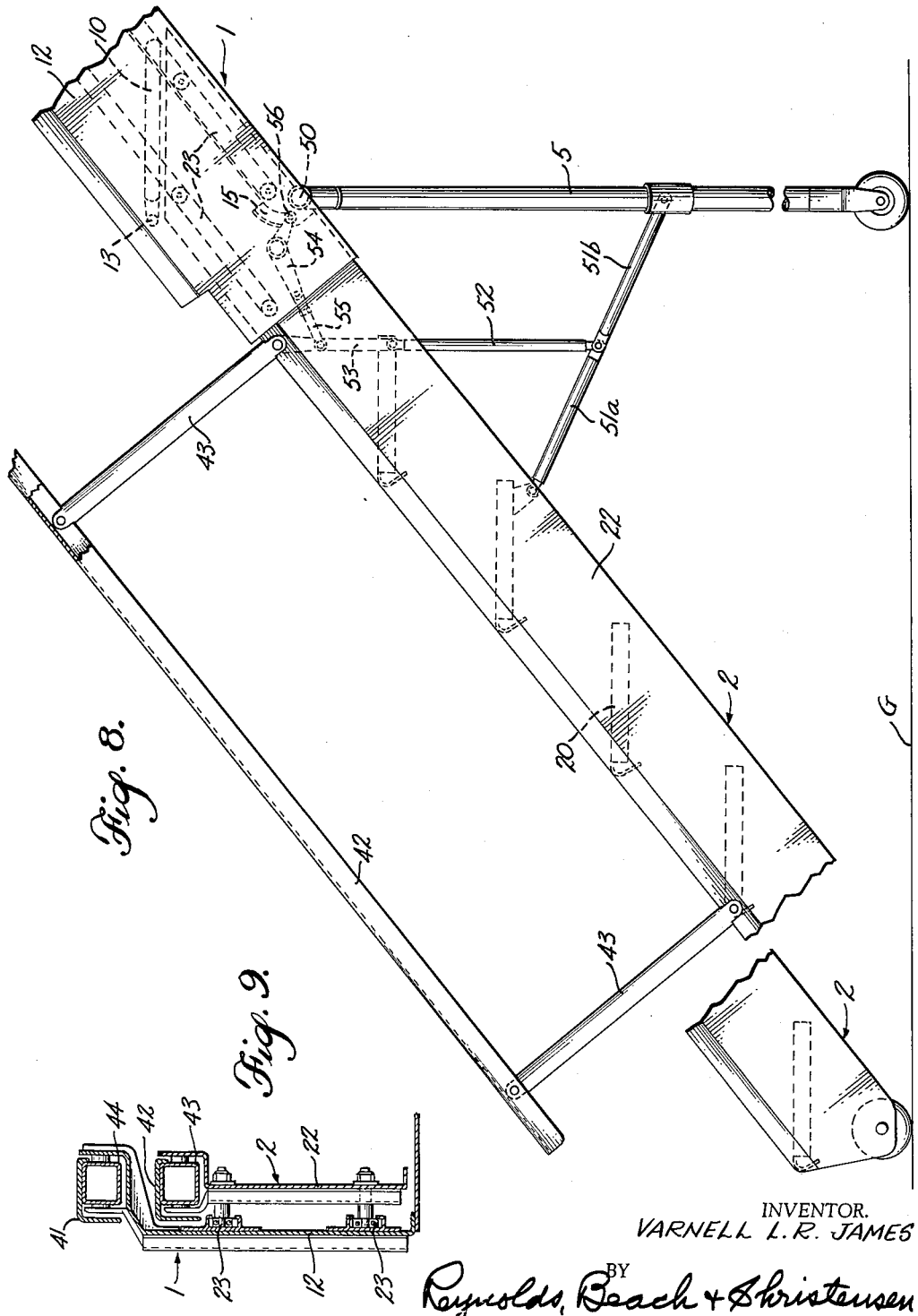

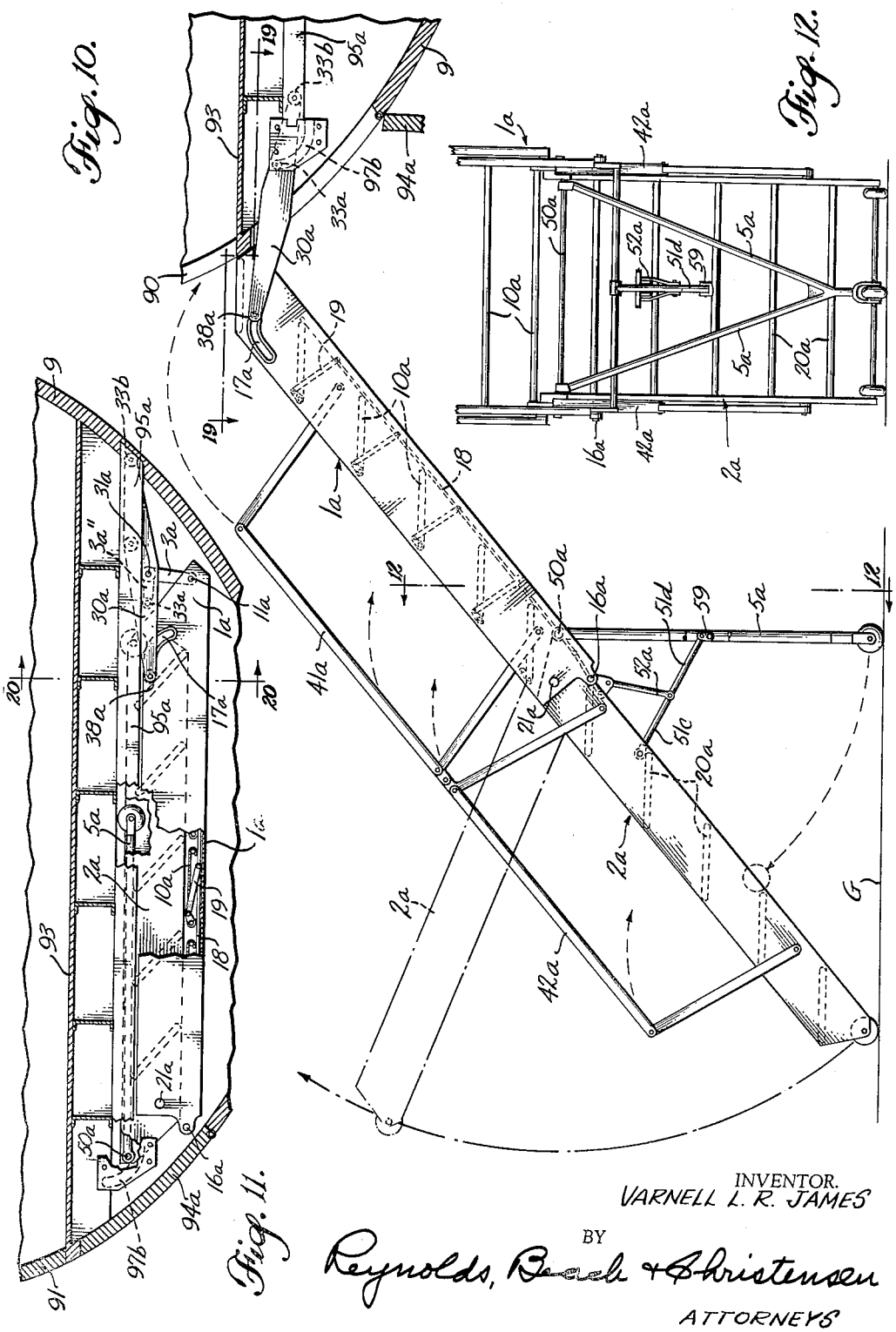

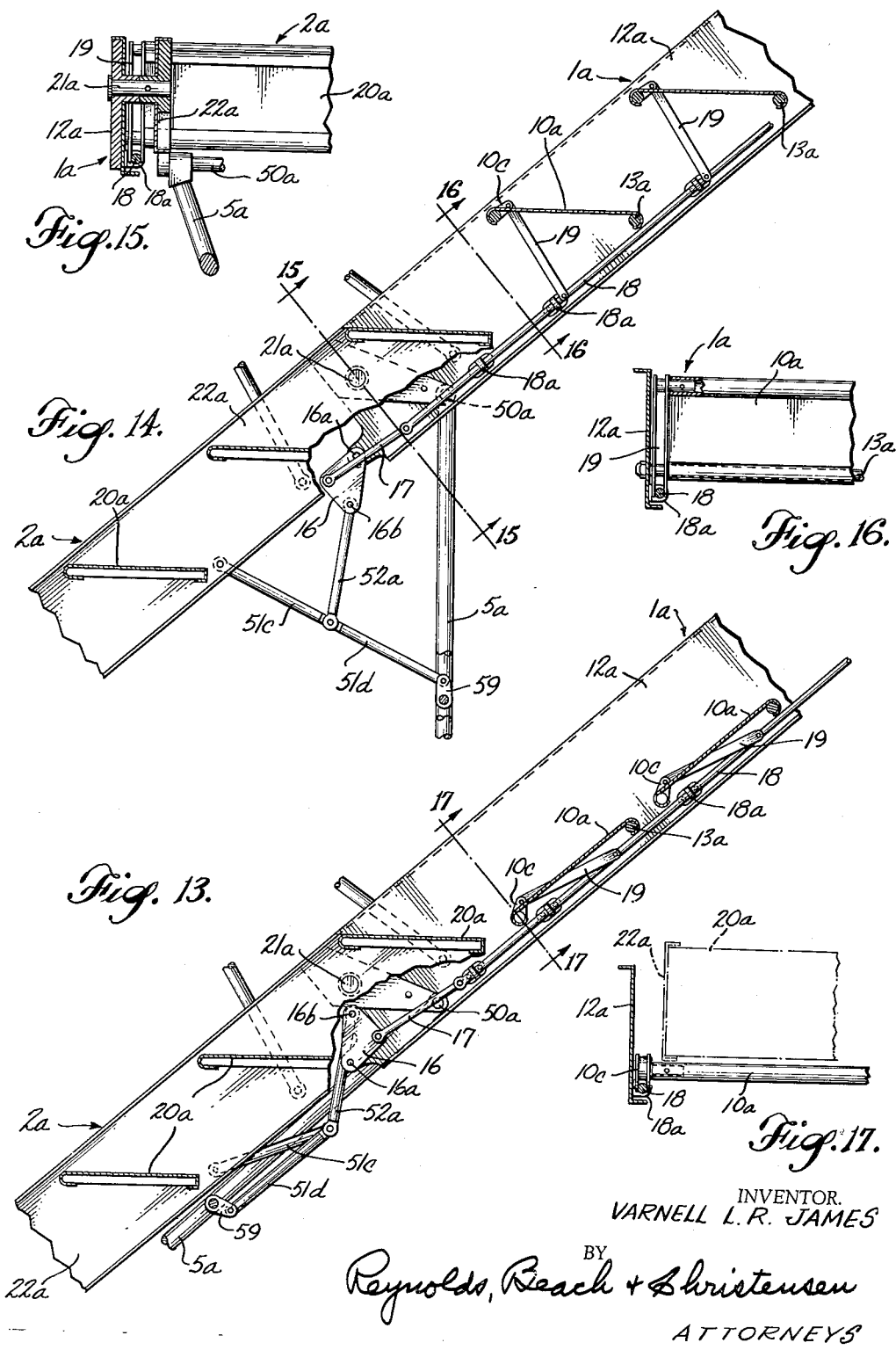

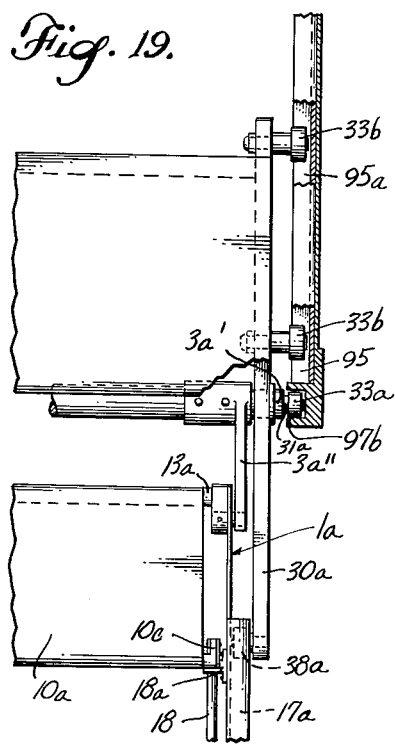
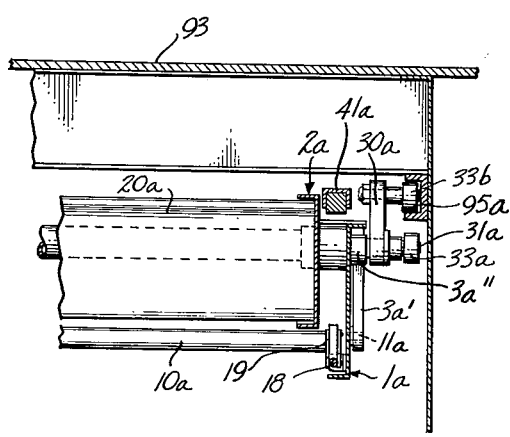
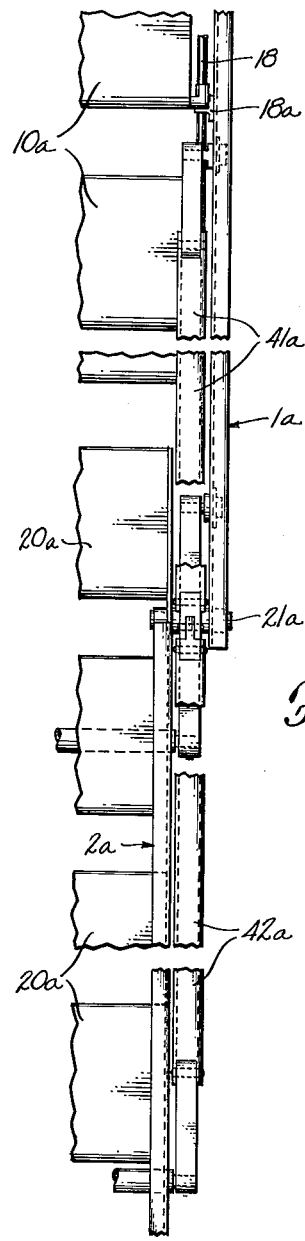

June 27, 1961

V. L. R. JAMES 2,990,148

AIRBORNE STAIRS

Filed May 10, 1957

INVENTOR.
VARNELL L.R. JAMES
BY
Reynolds, Beach & Christensen
ATTORNEYS

United States Patent Office 2,990,148
Patented June 27, 1961

2,990,148
AIRBORNE STAIRS
Varnell L. R. James, Seattle, Wash., assignor to Boeing Airplane Company, Seattle, Wash., a corporation of Delaware
Filed May 10, 1957, Ser. No. 658,460
4 Claims. (Cl. 244—129)

It is substantially uniform practice to deplane and emplane passengers on aircraft by trundling loading ramps or stairs up to the airplane after it has stopped at a loading station, ground crews being necessary in the handling thereof. Each landing field must be equipped with ramps adequate to cooperate with the several types and sizes of airplanes which can be expected to use the field.

There are a number of reasons why it may be preferable to eliminate such ramps, and to employ instead stairs which are mounted upon the airplane, capable of being retracted and stowed therein in flight, and of being extended to the ground by the aircraft crew, and made fully usable when the airplane is groundborne. Among such reasons, this would eliminate the expense of multiple ramps, for one stair assembly would serve each airplane at all landing fields. It would eliminate the necessity of providing ramps capable of adjustment to varying sizes and types of airplanes; it would eliminate the expense of ground-handling crews, or free their personnel for other duties. It would enable more rapid deplaning and emplaning, thereby cutting down on unproductive and wasteful idle time of the airplane, and permitting fuller utilization of the capabilities of jet airplanes to achieve faster schedules.

The present invention concerns such an airborne stair structure, and is shown in several different embodiments. The airplanes with which such stair structure would be used, which in themselves are not part of this invention, although constituting necessary supports for the stair structure, will ordinarily have their entrance and exit doorway well above ground level, in the side of the cabin structure, and any stair structure long enough to reach obliquely to the ground level will be found to be longer than can be stowed within any transverse cross-sectional dimension of the cabin structure, unless the same be formed in relatively retractable sections. According to the present invention, in its broad aspect, such a stair structure is formed of a plurality of sections, usually two, an upper and a lower section (referring to their disposition when in use), interconnected for telescoping, pivotal, or other like collapsing movement into a lesser length for stowage, with the upper section at its end which is uppermost in use supported from and guided upon the cabin structure for projective and retractive movement. In order that the collapsed and retracted stair structure shall require a minimum of space when stowed, the stair sections preferably occupy a common plane when stowed. Strut means for supporting the extended stair structure where the upper and lower sections join is ordinarily provided, and in at least one form shown the strut and its braces are operatively connected to the hingedly mounted treads to shift the latter into their operative position by movement of the strut into its operative position, and the reverse. Hand rails are provided, which are collapsed while the stair structure is stowed, and these may be automatically moved into operative position when another element (the lower stair section, the strut, or the treads, for example) is moved into its operative position, or the movement of the rails may be accomplished manually; both forms are shown.

The showing in the drawings is somewhat diagrammatic in character, and is intended to illustrate primarily the principles involved, as outlined above, with a minimum of detail to obscure the principal parts. Three forms are shown, (a) one in which the stair sections are telescopingly related, and movement of certain hand rails into operative position is automatic; (b) one in whch the lower stair section in hingedly or pivotally supported at the lower end of the upper section, and swings upwardly, outwardly and then downwardly relative to the upper section in unfolding, and restoration of the hinged treads in the upper section to their operative position is accomplished by movement of the strut into its operative position; and (c) one similar to (b), but wherein the lower stair section swings downwardly and outwardly in unfolding, and the hand rails may be manually shifted between stowed and operative positions.

This invention concerns such a stair structure, in its relation to the cabin structure, having the capabilities indicated above, and structurally formed as described.

FIGURES 1 to 9 illustrate the type (a) above, FIGURES 10 to 20 type (b), and FIGURES 21 and 22 type (c).

In detail, FIGURE 1 is a cross-section through the cabin structure at the doorway station, illustrating the stair structure in full lines in its stowed position, and in dot-dash lines in its projected position, but with the hand rails and strut omitted.

FIGURE 2 is a view similar to FIGURE 1, but showing all parts in the position of use, including the strut and the hand rail.

FIGURE 3 is a view of the stair structure in stowed disposition similar to FIGURE 1, but to a larger scale, broken away to show details such as the hinging of the treads.

FIGURE 4 is a view similar to FIGURE 3, with the stairway structure approaching its operative, projected position.

FIGURE 5 is a detail side elevational view of the extended but not yet fully operative stair structure, illustrating details of the strut and hand rail; FIGURE 6 shows like parts at a later stage in their movement into operative position; and FIGURE 7 is a similar view showing parts in their final position of use.

FIGURE 8 is a view similar to FIGURE 7, showing details of the strut and treads.

FIGURE 9 is a transverse section through the telescoped side frames at one side, of the upper and lower sections.

FIGURE 10 is a side elevational view of the complete stair structure of type (b) in its position of use.

FIGURE 11 is a view similar to FIGURE 3, with the stair structure stowed.

FIGURE 12 is a rear or underside elevational view, on the line 12—12 of FIGURE 10.

FIGURE 13 is a longitudinal sectional view through the stair structure, not yet fully operational, and FIGURE 14 is a similar view, with parts now in their operational positions.

FIGURE 15 is a cross-sectional detail, taken at the line 15—15 of FIGURE 14, and FIGURE 16 is such a detail, taken at the line 16—16 of FIGURE 14.

FIGURE 17 is a cross-sectional detail, taken at the line 17—17 of FIGURE 13.

FIGURE 18 is a plan detail of the hand rail and its relation to the stair structure.

FIGURE 19 is a plan detail of the interconnection between the stair structure and the cabin structure, the viewpoint being illustrated at line 19—19 of FIGURE 10.

FIGURE 20 is a cross-sectional detail, taken at line 20—20 of FIGURE 11, with parts stowed.

Figure 21:
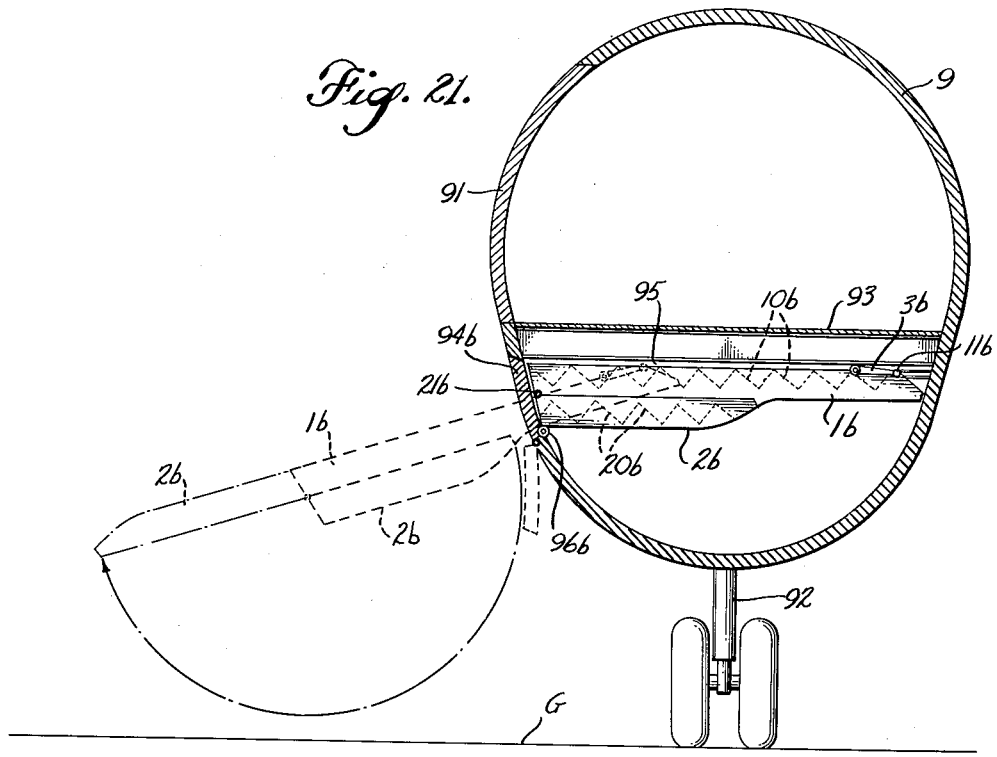
FIGURE 21 is a view similar to FIGURE 1, of type (c).
Figure 22:
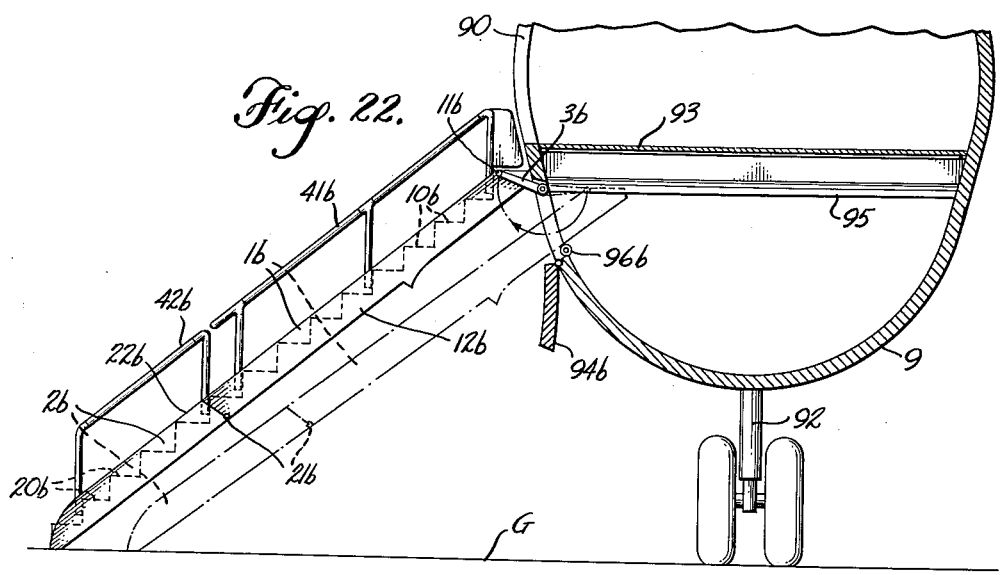
FIGURE 22 is a view similar to FIGURE 2.

The principle of operation can be illustrated simply by reference to FIGURES 21 and 22, although these are not the preferred structural forms. The cabin structure 9, of generally rounded or oval cross section, has a doorway 90 in a side, at a selected longitudinal station; a door 91 is suitably mounted for movement between open and closed positions. The cabin structure when groundborne is supported by landing gear elements 92 at an appreciable distance above the ground G. The passenger space is above a floor 93, the space therebelow being usually cargo space. The stair structure must be long enough to reach obliquely, at not too steep an angle, from the floor level to the ground, when in use. The requisite length is in excess of any cross-sectional dimension of the cabin structure, wherefore the stair structure must be formed of relatively retractable sections, so that it can be stowed crosswise (usually beneath the floor) during flight, and can be extended laterally and projected into operative position when the aircraft is groundborne. Extension and retraction are desirably effected by the aircraft crew.

The stair structure of FIGURES 21 and 22 consists of an upper section 1b and a lower section 2b, hingedly interconnected at 21b so that the lower section folds beneath the upper section, and swings downwardly and outwardly relative to the upper section during extension. The treads 10b and 20b are fixed between the respective side frames 12b and 22b, so while the folded sections occupy adjacent parallel planes, they do not, as in the forms to be described later, occupy the same plane when folded. The form of these FIGURES 21 and 22 occupies a little more of the cargo space, and requires a larger exit door 94b than do the other forms.

The upper end (upper when in position of use) of the upper section 1b is guided upon the cabin structure for transverse movement. The precise nature of the guiding interengagement is not important; as shown, a lever 3b is guided along a transverse guide rail 95 beneath the floor, and is pivotally connected at 11b to the upper section 1b, while the outwardly moving stair structure as a whole rolls over the roller 96b at the edge of the opening left when the door 94b swings open. The lever 3b, by the nature of its engagement with the guide rail 95, remains inwardly swung, as in FIGURE 21, until the stair structure is substantially fully projected, and then cam mechanism or the like, described in conjunction with FIGURES 3, 4, 10, and 11, causes it to swing, as the dot-dash circle in FIGURE 22 indicates, to complete the projection of the upper end, and to elevate this upper end to the proper height relative to the sill of the doorway 90. Meanwhile the lower section 2b has swung downwardly into alignment with the upper section, and its lower end rests upon the ground. Actuators or motors (not shown) may be provided for accomplishing such movements of the stair sections, and their reverse movements for stowage.

Handrails 41b and 42b are supported from the respective stair sections 1b and 2b. Each may be mounted upon its stair section for folding and unfolding, for example, by a pivotal mount upon the side frames 12b and 22b to enable them to swing inwardly for folding, or they may be seated in sockets in the side frames, for bodily removal.

The entire operation of extending the stair structure from stowed position to its position of use is quickly and easily performed by a member of the aircraft crew, and retraction is similarly rapid and easy.

The telescoping type shown in FIGURES 1 to 9 is believed to be preferable from a practical viewpoint. Here the lower stair section 2 with its fixed treads 20 connecting side frames 22 slides lengthwise along the upper section 1, between its side frames 12, through cooperating slides indicated at 23, and when retracted occupies the same plane as the upper section. Since the treads 10 of the upper section if they remained in the path of the telescoping lower section would block the latter's movement, they are hingedly mounted at 13, along one transverse edge, to swing into a common plane at one side of the path of the lower section, and so to clear the way for the latter. Their swinging aside may be accomplished by contact of the upper end of the lower section with successive treads 10, as shown in FIGURES 1 to 9, or positively, by means such as are shown in the form of FIGURES 10 to 20, to be described later.

In the form of FIGURES 1 to 9 a carriage 30 is guided along the guide rail 95, and a lever 3 is pivoted thereon at 31, and at one end is pivoted at 11 to the upper end of the upper section 1. The opposite end of the lever carries a cam follower 33, guided in a cam track 97 extending transversely of the cabin structure. The cam follower 33 is thrust forwardly, in the direction of extending movement, and hence the lever 3 is held against pivotal movement during such transverse projective movement of the carriage 30 and stair structure. Only when its cam follower 33 engages the terminal portion 97a (FIGURES 3 and 4) can the lever 3 be rotated clockwise. Its rotation occurs when its follower 33 engages the end of cam track 97 to block further leftward movement, yet carriage 30 still continues its leftward movement. This swings the upper end of the stair structure upward to the correct level relative to the floor 93 and the sill of the doorway 90. A similar arrangement may serve for the form of FIGURES 21 and 22, as has already been suggested.

The stair structure exits from the cabin structure through a small doorway which is normally closed by a door 94. This door may move inwardly and then downwardly, guided at 94a, in opening. The end of the stair structure opposite the carriage-supported end may be supported on a roller 96, which in this instance is carried upon swingable arms 96a, controlled as to position in any suitable manner (not shown).

Handrails 41 and 42, carried by the respective sections 1 and 2, are mounted for swinging into their position of use, as in FIGURES 7 and 8, from their inoperative position, as in FIGURE 5, FIGURE 6 showing an intermediate position. To support the joint between the extended sections securely, a strut 5 may be employed, and this too is movable between a collapsed position (FIGURE 5 shows it slightly moved therefrom) and an upright operative position (FIGURES 2 and 8). In these figures the strut and the handrails cooperate and move conjointly, and mutually brace one another.

The strut 5 is pivoted at 50 near the upper end of the lower section 2, and when stowed lies close against the under side of that section. A two-part brace, 51a, 51b, connects the section 2 and the strut distantly from the pivot 50, and when the two parts are aligned, as in FIGURE 8, act as a toggle to lock the strut in upright position. Their movement into and from aligned position is under control of linkage mechanism that includes the arm 53, the lever 54, and the connecting link 55, together with the brace 52. The lever 54 carries a cam follower 56 at one end, and when this engages the fixed cam 15 (FIGURE 8) upon the section 1 at the end of the projective movement of section 2, the linkage mechanism swings in a manner to extend the strut 5 into its operative position. In somewhat greater detail, starting with parts in the positions of FIGURE 5, with the lower section 2 just finishing its extending movement, the cam follower 56 on section 2 has engaged and is being restrained by cam 15 fixed upon section 1. The cam 15 is shaped to effect clockwise rotation of lever 54 when this occurs, and lever 54 and link 55 act as toggle links, and approach alignment from folded position. FIGURE 6, by comparison with FIGURE 5, shows the start of this unfolding, and the two are aligned in FIGURES 7 and 8. Link 55 being hingedly connected to arm 53, outwardly of the latter's pivot upon section 2, forces arm 53 downwardly, and arm 53 and brace 52 form a second toggle pair that unfold and come into alignment. Finally, brace 52 acts upon the two-part brace 51a, 51b, which constitutes a third toggle pair, unfolding them and holding them ultimately in alignment. Their movement swings the strut 5 downwardly, and braces it thus, as in FIGURE 8. Meanwhile, the swinging of arm 53 swings the post 43 upwardly, the two being conjointly movable. The toggle linkage 54, 55 braces the post 53 in its upright position. The posts 43 and 44, and handrails 41, 42 lie only at the sides of their respective sections (see FIGURE 9) and do not interfere with other mechanism.

The same linkage mechanism can be employed to effect movement of the handrails into their position of use. The handrail 42 of the lower section 2 is shown as mounted upon parallel posts 43 which function as parallel links. The arm 53, pivoted coaxially with one of the posts 43, will effect upward swinging thereof as the strut 5 swings downwardly into its operative position; compare FIGURES 6 and 7 or 8. By similarly mounting the upper handrail 41 upon parallel posts 44, and by locating a socket 45 on the under side of the handrail 41 in the path of the rising hooked end 46 of the handrail 42, the movement of the handrail 42 will entrain like movement of the handrail 41. A final section 4 (FIGURES 1, 2) can be manually joined to the hand rail 41 to brace the whole.

Briefly to describe movement from stowed or folded position to operative or unfolded position, i.e., from the position of FIGURE 1 to that of FIGURE 2, the door 94 is first opened, and leftward movement of the telescoped sections 1, 2 is begun. The left hand end of the sections rides on roller 96, and the right hand end is pivoted at 11 to carriage 30 running in guides 95, with the end of lever 3 running in track 97. Whether section 2 begins to extend relative to section 1 before both are projected through the opening normally closed by door 94, or not, is immaterial. A latch might retain them telescoped until section 1 is fully projected. When section 1 reaches its extreme leftward limit follower 33 has moved into terminal portion 97a, and has caused lever 3 to swing the upper end of section 1 upward outside of and close to the level of the sill of doorway 90. Since by now section 2 is fully down, or can be released to slide downwardly, since section 1 is inclined downwardly, the treads 10 of section 1 each will, by gravity or otherwise, swing downwardly from its coplanar stowed position to a level position. The strut 5 likewise swings downwardly from its stowed position, wherein it is coplanar with section 2, by action of cam 15 or by gravity, to its vertical position. The several linkages and toggle mechanisms 54, 55; 53, 52; and 51a, 51b all straighten out and lock, and swinging of posts 43 to their unfolded or upright positions accompanies pivotal movement of arm 53. Upward movement of handrail 42, by its engagement at 45, 46 (FIGURES 5 to 7) with handrail 41, will raise the latter and its posts 44. Connection of a short section 4 between the doorway 90 and the rail 41 locks parts in position. Stowage of the stirway is effected by the reverse procedure.

The form shown in FIGURES 10 to 20 combines features of the other two forms described. Like the form of FIGURES 21 and 22 the upper and lower stair sections 1a and 2a are pivotally connected at 21a, but now the lower section 2a swings upwardly and inwardly as it retracts (FIGURE 10), to occupy the same plane as the upper section 1a. This requires that the treads 10a of the upper section hinge along their rear transverse edge, at 13a, to swing into a common plane, as in FIGURES 11 and 13, to leave a clear space between the side frames 12a for the side frames 22a and the fixedly supported treads 20a of the lower section 2a, in folding. An equivalent result could be obtained by hinging the treads 20a at their forward edge, so that they might fold into a common plane to avoid interference with fixed treads 10a. The mechanism to move the treads 10a will be described shortly.

Whereas the hingedly mounted lower section 2b of FIGURES 21 and 22, since it swings downwardly and outwardly in unfolding, may be self-bracing, the reverse swinging of the lower section 2a requires supplemental bracing. A strut 5a is pivotally mounted upon the lower section 2a, at 50a, and as before is braced by toggle links 51c and 51d, from the lower section 2a, but differing from the form previously described, there is a short arm 59 interposed between the strut 5a and the link 51d. Movement of the toggle link braces can be effected by the link 52a, or conversely, the folding and unfolding of the strut 5a and its links described can effect folding and unfolding of the treads 10a, through mechanism which is operatively connected to the link 52a.

A triangular lever 16 is pivoted at 16a upon the upper section 1a, and the link 52a is pivotally connected at 16b to this lever 16. A tread-actuating link 17 pivots at the third corner of lever 16, and connects to a long rod 18, guided at 18a upon the upper section 1a for movement in the direction of its length. Links 19 connect the rod 18 at proper intervals to the treads 10a, at 10c, whereby the treads can be swung about their pivot axes 13a between coplanar collapsed position (FIGURE 13) and parallel operative position (FIGURE 14).

Conjoint swinging of the strut 5a and treads 10a into inoperative position precedes swinging of the lower section 2a upwardly and inwardly into its retracted or folded position with respect to the upper section 1a. The lower section swings about its hinge axis at 21a relative to the upper section. While there may be lack of coincidence between the hinge axis at 21a and any hinge center of the strut linkage, the small arm 59 permits a certain amount of free movement in the strut linkage, and in the connected tread linkage, so that no binding occurs.

The two sections, 1a and 2a, when folded can slide conjointly into and from the cabin structure through the opening left by the opened door 94a. As in the form of type (a), the upper end of the section 1a is supported from a carriage 30a through a lever 3a', 3a", bell crank in form. The lever arm 3a' is pivotally connected to the upper section 1a at 11a. The carriage 30a is guided at 33b in a guide 95a disposed transversely of the aircraft structure, and the arm 3a" of the lever has its cam follower 33a guided at 97b, whereby to tilt the entire carriage 30a upwardly at the end of its projective movement; see FIGURE 10. The connection between the carriage at 38a and the section 1a is by means of a curved cam slot 17a, rather than a fixed pivot, wherefore this upward tilting of the carriage 30a is permitted, and effects upward movement of the uppermost tread 10a to the level of the sill of the doorway 90, as FIGURE 10 shows.

The handrails 41a and 42a are manually shiftable from a folded to an unfolded position, and the reverse, as FIGURE 10 suggests.

Briefly, then, extension of parts from the stowed position of FIGURE 11 to the extended, operative position of FIGURE 10 begins, as before, by opening of door 94a followed by projection of section 1a and of section 2a coplanar therewith. Treads 10a are folded down into coplanar disposition. Carriage 30a moves in horizontal guides 33b; when its roller 33a enters cam 97b, the entire carriage 30a tilts upwardly, to bring the upper end of section 1a level with the sill of doorway 90. Section 2a is now swung about its pivot 21a (a motor, not shown, can be arranged to do this, under control from the cabin) until it is aligned with section 1a, as in FIGURE 10. The strut 5a is then swung downwardly, by hand or otherwise, and through the linkage 52a, 16 the braces 51c and 51d are locked, and through link 17 the rod 18 moves treads 10a into level position, and links 19 brace them there. The handrails are upraised by hand. Stowage, again, follows a reverse procedure.

I claim as my invention:

1. A projective and retractive stair assembly for disposition transversely of an aircraft cabin structure or the like, said stair assembly including a guide adapted to be fixedly mounted transversely of the cabin structure in generally horizontal disposition, a carriage slidable along said guide, a stairway section, a lever pivoted intermediate its ends upon the carriage, and at one end pivotally supporting the upper end of the stairway section for projection and retraction thereof, a cam track engaging the opposite end of the lever, and disposed generally parallel to the guide, and a terminal portion of said cam track, at its projective end, being formed to swing said lever in the direction to elevate the upper end of the stairway section during final projective movement thereof.

2. A stair assembly for use in an aircraft cabin structure which has a doorway in its side at a given station, and of a given maximum cross-sectional dimension at that station, comprising an upper and a lower section each of a length less than such maximum dimension, and each including opposite side frames and treads supported from and extending between said side frames, a guide adapted to be fixedly mounted transversely of the aircraft structure at such station, means guided upon said guide for supporting and guiding the upper end of the upper section for movement along said guide between a stowed position and a projecting position of use, means interengaged between the two sections for supporting and guiding the lower section for telescoping movement relative to the upper section, a strut pivotally supported beneath the lower section for ground support of its upper end, a rail parallel to each side frame of the lower section, posts each pivotally supported at one end upon a side of the lower section and pivotally connected at its other end to the corresponding rail, brace means interconnecting said posts and said strut for conjoint movement between stowed positions alongside the lower section and an extended position of use, a rail parallel to each side frame of the upper section, posts similarly supporting each such rail from the corresponding side frame, and means interengageable between the corresponding upper and lower rails, to raise the one by raising of the other.

3. For use with an aircraft cabin structure having a doorway in its side at a given station, and of a given maximum cross-sectional dimension at that station, a stair assembly including two stairway sections and means interconnecting the two sections for relative movement between an aligned position of use and a relatively retracted position, each section being of a length when thus retracted, less than such maximum dimension, fixed, horizontally disposed means, guiding the stair assembly for movement between a projected position and a retracted position, a handrail for each section and means supporting the same for movement between a stowed position, alongside its section, and an upraised position of use, and means shiftable as the lower section shifts between its two positions, and operatively connected to said handrails to effect their corresponding movement automatically, said rail-moving means being directly connected to the handrail of the lower section only, the handrail of the upper section having an end disposed, when stowed, in the path of movement of an end of the handrail of the lower section, and complemental means carried by these two ends, interengageable to effect corresponding movement of the upper section's handrail as the lower section's handrail is moved by shifting of the lower section.

4. The combination of claim 3, including a ground-engaging strut pivotally mounted upon the lower section, at the latter's upper end, and swingable between a stowed position, parallel to the lower section, and an upright position of use, said strut being operatively connected to the handrail to move the latter, and constituting the shiftable means to effect corresponding movement of the handrail.

References Cited in the file of this patent
UNITED STATES PATENTS

| | | |
|---|---|---|
| 305,516 | Fisher | Sept. 23, 1884 |
| 961,357 | Ketelsen | June 14, 1910 |
| 995,273 | Mead | June 13, 1911 |
| 2,453,937 | Ray | Nov. 16, 1948 |
| 2,531,263 | Fink et al. | Nov. 21, 1950 |
| 2,558,975 | Moreno et al. | July 3, 1951 |
| 2,647,677 | Reed | Aug. 4, 1953 |
| 2,812,528 | Odell | Nov. 12, 1957 |